(12) United States Patent
Olsen

(10) Patent No.: US 6,590,687 B1
(45) Date of Patent: Jul. 8, 2003

(54) LOW POWER OPTICALLY COUPLED SERIAL DATA LINK

(75) Inventor: Stewart L. Olsen, El Paso, TX (US)

(73) Assignee: El Paso Natural Gas, El Paso, TX (US)

(*) Notice: Subject to any disclaimer, the term of this patent is extended or adjusted under 35 U.S.C. 154(b) by 0 days.

(21) Appl. No.: 09/266,698

(22) Filed: Mar. 11, 1999

(51) Int. Cl.[7] .............................................. H04B 10/04
(52) U.S. Cl. ........................ 359/184; 359/185; 359/186
(58) Field of Search ................. 359/184, 185, 359/186

(56) References Cited

U.S. PATENT DOCUMENTS

| | | | |
|---|---|---|---|
| 3,727,061 A | 4/1973 | Dworkin | 250/199 |
| 3,794,841 A | 2/1974 | Cosentino et al. | 250/199 |
| 4,249,266 A | 2/1981 | Nakamori | 455/608 |
| 4,262,220 A | 4/1981 | Delacruz | 307/311 |
| 4,395,590 A | 7/1983 | Pierce et al. | 179/2 DP |
| 4,417,099 A | 11/1983 | Pierce | 179/2 DP |
| 4,497,068 A | 1/1985 | Fischer | 455/608 |
| 4,656,318 A | 4/1987 | Noyes | 379/93 |
| 4,694,504 A * | 9/1987 | Porter et al. | 455/608 |
| 4,713,841 A | 12/1987 | Porter et al. | 455/608 |
| 4,817,204 A | 3/1989 | Jannelli et al. | 455/607 |
| 4,847,873 A | 7/1989 | Kuwaoka et al. | 375/99 |
| 4,859,873 A * | 8/1989 | O'Shaughnessy et al. | 307/290 |
| 5,051,980 A | 9/1991 | Olsen | 370/32.1 |
| 5,060,306 A | 10/1991 | Nakamura et al. | 359/173 |
| 5,075,792 A | 12/1991 | Brown et al. | 359/152 |
| 5,087,982 A | 2/1992 | Smothers | 359/137 |
| 5,214,526 A | 5/1993 | Tonomura | 359/184 |
| 5,220,582 A * | 6/1993 | Kaharu et al. | 375/55 |
| 5,345,327 A | 9/1994 | Savicki | 359/172 |
| 5,369,687 A | 11/1994 | Farkas | 379/98 |
| 5,421,018 A | 5/1995 | Hiyama | 395/800 |
| 5,428,470 A | 6/1995 | Labriola, II | 359/119 |
| 5,519,527 A | 5/1996 | Panton | 359/159 |
| 5,523,676 A * | 6/1996 | Bach et al. | 324/103 |
| 5,555,421 A | 9/1996 | Enzinna | 395/750 |
| 5,600,471 A | 2/1997 | Hirohashi et al. | 359/152 |
| 5,659,299 A | 8/1997 | Williamson et al. | 340/825.57 |
| 5,664,231 A | 9/1997 | Postman et al. | 395/893 |
| 5,726,789 A | 3/1998 | Horiuchi et al. | 359/184 |
| 5,729,371 A | 3/1998 | Yoshida et al. | 359/154 |
| 6,111,680 A * | 8/2000 | Harvey | 359/181 |
| 6,151,149 A * | 11/2000 | Rybicki et al. | 359/186 |
| 6,188,494 B1 * | 2/2001 | Minteer | 359/152 |

* cited by examiner

Primary Examiner—Jason Chan
Assistant Examiner—Dzung Tran
(74) Attorney, Agent, or Firm—Locke Liddell & Sapp LLP

(57) ABSTRACT

The invention relates to a system for optically transmitting digital information. In one version, the invention includes an optical transmitter having an input for electronically receiving digital information, a pulse width modulation circuit that modulates the digital information into electronic pulses having either a first width or a second width depending on the logic level of the digital information, and a device for generating optical pulses responsive to the electronic pulses, the width of the optical pulses being proportional to the widths of the electronic pulses, and a receiver that receives optical pulses generated by the optical transmitter, the receiver including a device for generating received electronic pulses responsive to the digital information, the width of the received electronic pulses being responsive to the width of the received optical pulses and having either a first width or a second width which is responsive to a first logic level in digital information and a second logic level in the digital information, respectively.

9 Claims, 3 Drawing Sheets

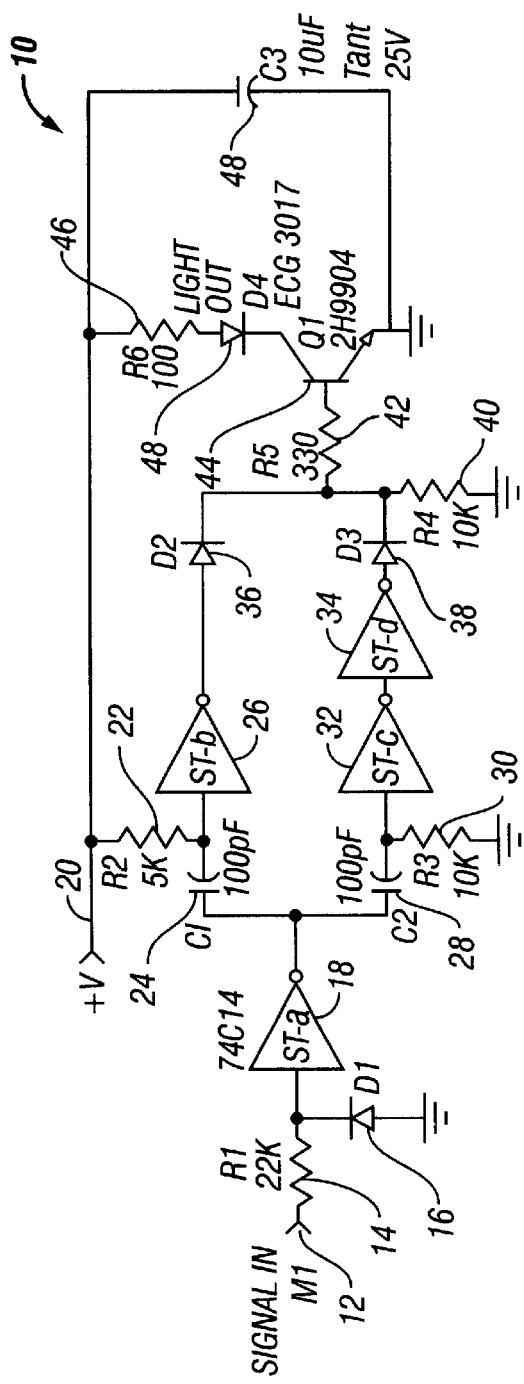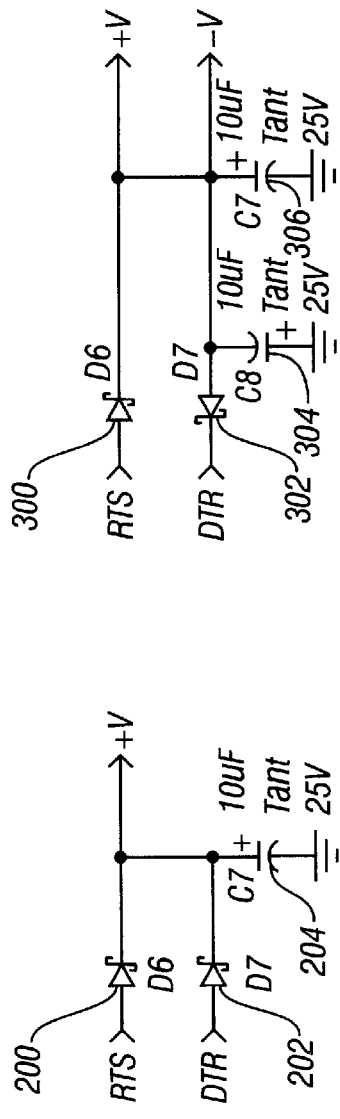
FIG. 1
FIG. 2
FIG. 3

LOW POWER OPTICALLY COUPLED SERIAL DATA LINK

TECHNICAL FIELD

This invention generally relates to electronic communications, and in particular, to a low power optically coupled serial data link which may be adapted for use with standardized communication protocol such as RS-232.

BACKGROUND OF THE INVENTION

Power consumption in electronic communication equipment has become increasingly problematic in recent years with the proliferation of computerized devices and sensors. Industrial applications utilize a wide variety of "smart" devices, such as differential pressure transmitters, temperature sensors and other devices, which gather and transmit data to a centralized computer system. Often, these devices are located in geographically remote areas which makes access by maintenance personnel difficult and expensive. These devices are often battery or solar powered to enable them to communicate with the host computer. However, the communication circuits consume a great deal of power, requiring larger, heavier and/or more expensive batteries and solar panels in order to allow the equipment to function unattended for an extended length of time.

Moreover, many of these devices communicate over standardized protocols, such as RS-232 which tend to consume comparatively large amounts of power. Although more efficient communication circuits could be designed, they are impractical to use with conventional components since most vendors have built standardized interfaces into their equipment.

Moreover, all RS-232 signals are referenced to a common ground point, and because of this, connecting systems with different ground potential is difficult. More particularly, the common ground of the RS-232 interface introduces noise in the data channel, makes low level measurements difficult, and introduces susceptibility to damage from lightning generated surges. One solution to this has been the use of optical fiber and optical isolation circuits. However, this also increases the power consumption of both the transmitter and receiver portions of an RS-232 communication circuit. This in turn requires even larger, heavier and more costly batteries or solar panels.

Still a further problem with conventional RS-232 communication circuits is that the RS-232 interface specifies a maximum data rate of 50 feet at 19.2 KBaud. This transmission rate limitation becomes increasingly important as modem computer equipment attains increasingly higher processing speeds. To overcome this limitation, standard communication systems using the RS-232 specification either tend to keep the transmission rate below 19.2 KBaud, or include other transmission equipment, such as modems, between the RS-232 interface. In either event, power consumption and system costs are increased.

Accordingly, it is an object of the invention to provide an optical interface that consumes comparatively little power from its power source, yet is adaptable to standardized communication protocols. It is a further object of the invention to provide an optical serial interface that allows data transmission rates in excess of 19.2 KBaud using, for example, standard RS-232 protocol without consuming excessive amounts of power. It is still a further object of the invention to provide an optical data interface that allows for accurate measurement of low level signals, even in the presence of electromagnetic interference from alternating current equipment, while providing increased protection from electrical surges.

Other objects and advantages of the invention will become apparent in view of the following disclosure.

BRIEF DESCRIPTION OF THE DRAWINGS

FIG. 1 is a schematic diagram of an optical data transmitter circuit according to an embodiment of the invention.

FIG. 2 is a schematic diagram of a power supply circuit useful with the present invention having a uni-polar output.

FIG. 3 is a schematic diagram of a power supply circuit useful with the present invention having a bi-polar output.

SUMMARY OF THE INVENTION

Figure 4:
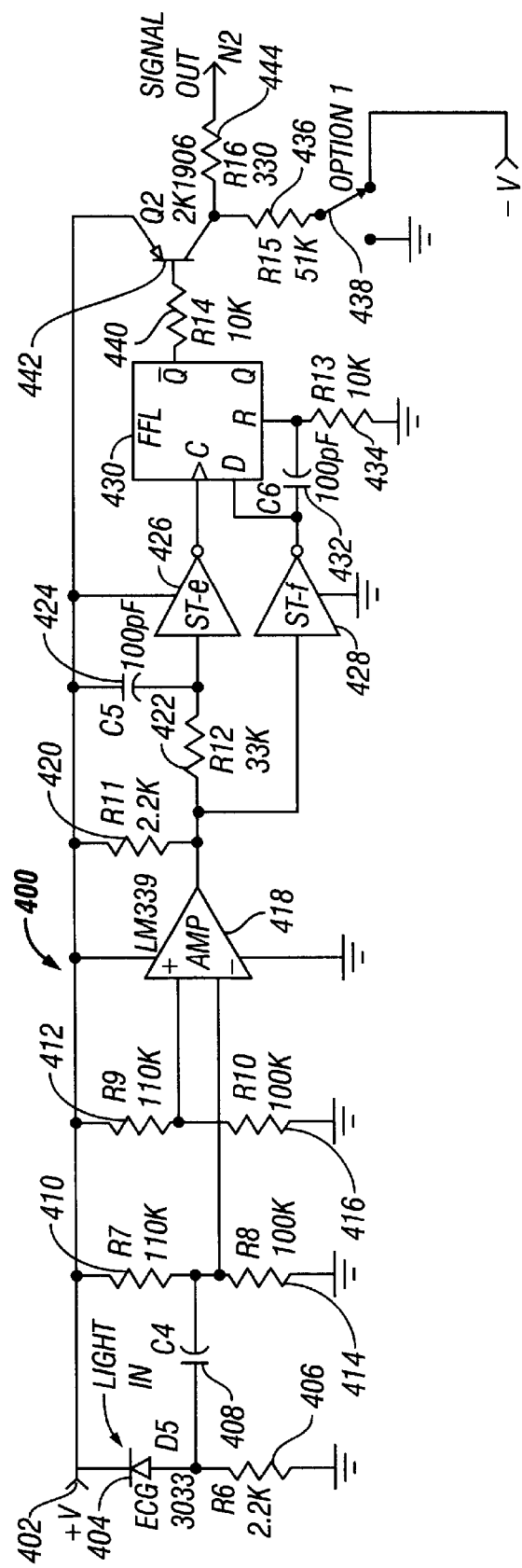
FIG. 4 is a schematic diagram of an optical receiver circuit according to an embodiment of the invention.

One aspect of the invention relates to a unique circuit design which provides an optically isolated serial data link that preserves the timing of the data and consumes extremely little power when compared to conventional devices. In one version of the invention, the circuit includes a high-power, low-duty factor pulse width modulator that encodes the signal transitions in an incoming data stream to provide data compression. The pulse width modulation of the invention reduces the power required to transmit sequential digital values, i.e., 1's or 0's. The pulse width modulation encoding of the signal transitions may be easily adapted to standard interfaces, such as RS-232 as will be explained in detail herein.

The pulse-width modulation coding of the signal transitions includes converting electronic digital signals from an incoming data stream into optical pulses having widths that vary depending on the logic level of the electronic signal. This provides electrical isolation and consumes less power than if the RS-232 connections were with direct wire connections.

The pulse-width modulation is used in conjunction with data signal edge transition detection to encode and deliver high energy pulses of short duration to a light emitting diode ("LED") in order to achieve the conversion from electronic to optical energy. As will be described in greater detail herein, this is performed in such a way that both the data and the timing information present in the original serial data stream are maintained.

Additionally, the pulse width modulation coding allows any number of consecutive 1's or 0's to be transmitted using no more power than the transmission of a single 1 or 0. This is possible since the RS-232 standard sends multiple 1's as continuous negative voltage, and multiple 0's as continuous positive voltage for up to a maximum of 11 and 10 bit times, respectively. Since one embodiment of the invention uses pulse width encoding based on the leading edge of the incoming signal transition, only one optical pulse is sent for any number of consecutive ones and a single pulse for any number of consecutive zeros. More specifically, it will be appreciated by those skilled in the art that a typical asynchronous signal is actually dependent on internal timing, for example, in the RS-232 protocol, up to eleven bit times following the start bit. After that time, the next character to be transmitted is started with a subsequent start bit. The subsequent start bit informs the system that another character is being transmitted. The baud rate is the same as the bit rate for the eleven bit times. Of course, eight bits of data are commonly referred to as a "byte" and may represent a binary number or an ASCII character. This feature could also be readily adapted to other embodiments of the invention for use with synchronous communication links where even longer groups of 1's and 0's are possible.

DETAILED DESCRIPTION OF EMBODIMENTS OF THE INVENTION

Referring now to FIG. 1, there is shown a schematic diagram of an optical serial data transmitter 10 according to an embodiment of the invention. In this case, the transmitter 10 receives a digital signal to be transmitted over the optical data link at input 12. The digital signal is typically an incoming data stream from a peripheral device, such as a pressure sensor. Resistor 14 and diode 16 provide surge protection and buffer amplifier 18 is a conventional Schmitt trigger used to square up the input signal to improve the edge detection of the signal by the other components in the transmitter 10. It will be appreciated that Schmitt trigger 18 operates to invert the incoming signal and to square-up the incoming wave form. Other devices for performing the functions of the Schmitt triggers described herein will occur to those of skill in the art and could be substituted as a matter of design choice, such as operational amplifiers and inverters. In one particularly advantageous embodiment, the Schmitt triggers used in the circuits depicted in FIGS. 1 and 4 may be packaged in a single Hex Schmitt trigger IC package.

Resistor 14 and diode 16 also provide a high impedance and protection from RS-232 negative voltages. The output of the Schmitt trigger 18 is then passed to a pulse width modulation circuit.

The pulse width modulation circuit contains two signal paths which will be referred to for convenience as the "long duration path" and the "short duration path", respectively. The long duration path includes Schmitt trigger 26 which is biased to the high voltage supply rail 20. The input to Schmitt trigger 26 is connected to an RC network consisting of resistor 22 and capacitor 24. These components control the duration of the output signal provided by Schmitt trigger 26 as will be described in greater detail herein. The output of Schmitt trigger 26 is connected to diode 36.

The short duration path of the pulse width modulation circuit consists of Schmitt trigger 32 which is biased to ground or the low voltage rail, as the case may be. The input to Schmitt trigger 32 is connected to an RC timing network formed by capacitor 28 and resistor 30. The output of Schmitt trigger 32 is passed to invertor 34 and, in turn to diode 38. Diodes 36 and 38 and resistor 40 form an OR gate that drives transistor 44.

The output of both signal paths of the pulse width modulator are connected to the input of transistor 44 through resistors 40 and 42. Transistor 44 operates as a switch to activate and deactivate LED 48 which is connected to the high voltage rail by resistor 46. Capacitor 49 provides additional energy to drive LED 48 when activated.

The operation of the optical transmitter shown in FIG. 1 will be described in detail with respect to the timing diagram shown in FIG. 5. Also, the operation of this embodiment of the invention will be described in conjunction with its adaptation to the RS-232 standard. However, it will be understood that this is for purposes of illustration only, and the invention could readily be adapted to other communication standards, or used with custom communication standards as a matter of design choice.

Figure 5:
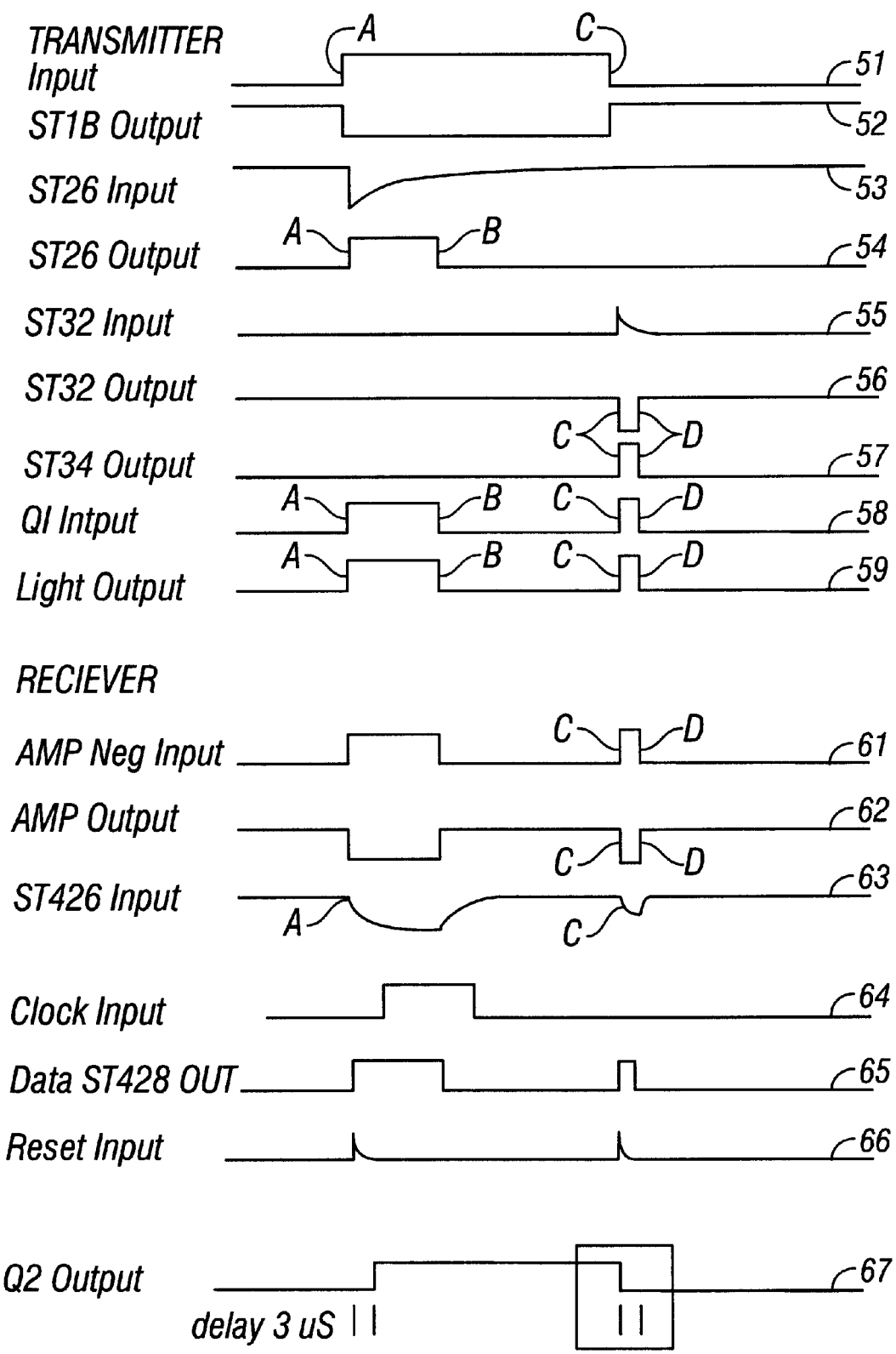
FIG. 5 is a timing diagram showing the signals at various points in the circuits shown in FIGS. 1 and 4 in response to signal transitions in the incoming data stream.

According to the RS-232 standard, a positive voltage is interpreted as a digital "0" and a negative voltage or Low logic level is interpreted as a digital "1." As shown in FIG. 5, the input signal 51 transitions from a low voltage to a high voltage at time A, indicating that one or more digital 0's are to be transmitted. The edges of input signal 51 are sharpened and the signal is inverted by Schmitt Trigger 18. The output of Schmitt Trigger 18 is depicted as signal 52. When the output from Schmitt Trigger 18 goes low, capacitor 24 will begin to charge through resistor 22. Assuming that the input to Schmitt Trigger 26 was high prior to the time A, then the input seen by Schmitt Trigger 26 will initially fall low and then rise as shown in signal 53. Since Schmitt Trigger 26 is biased to the high voltage rail 20, its output signal 54 will transition high at time A and will remain high until capacitor 24 is charged to a voltage level substantially equivalent to 60% of the high voltage rail 20. The output of Schmitt Trigger 26 will then transition low at time B. Note that the input signal transition from low to high at time A does not cause a corresponding transition in the input signal 55 to Schmitt Trigger 32. Thus, the components in the Short duration signal path of the pulse width modulation circuit do not change state as a result of the transition of the input signal at time A.

Referring again to signal 54 in FIG. 5, it is seen that the output of Schmitt trigger 26 is high from time A to time B. During this time, the input signal 58 to transistor 44 is also high, causing transistor 44 to turn on and activate LED 48. The signal from the light pulse generated by the LED 48 is shown as signal 59.

At time period C, the input signal transitions from high to low, indicating that one or more I's are to be transmitted. This causes the output signal 52 from Schmitt trigger 18 to transition from low to high. The low to high transition on signal 52 does not cause a transition at the input to Schmitt trigger 26 and accordingly, the output signal 54 of Schmitt trigger 26 remains low at time C, and no transitions occur in the long duration signal path of the pulse width modulator.

In the short duration path, it is seen that the input signal 51 transitions from a high voltage to a low voltage at time C. The edges of input signal 51 are sharpened and the signal is inverted by Schmitt Trigger 18. The output of Schmitt Trigger 18 is depicted as signal 52. When the output from Schmitt Trigger 18 goes high, capacitor 28 will begin to charge through resistor 30. Assuming that the input to Schmitt Trigger 32 was low prior to time C, then the input seen by Schmitt Trigger 32 will initially rise high and then fall as shown in signal 55. Since Schmitt Trigger 32 is biased to the low voltage rail, its output signal 56 will transition low at time C and will remain low until capacitor 28 is charged to a voltage level substantially equivalent to 60% of the high voltage rail 20. The voltage across resistor 30 will be about 40% of the voltage rail and the output of Schmitt Trigger 32 will then transition high at time D. The output of Schmitt Trigger 32 is inverted by Schmitt Trigger 34 whose output is shown as signal 57. Note that the input signal transition from high to low at time C does not cause a corresponding transition in the input signal 53 to Schmitt Trigger 26. Thus the components in the long duration signal path of the pulse width modulation circuit do not change state as a result of the transition of the input signal at time C.

In essence, the circuit described in FIG. 1 operates to convert a transitioning input signal to a pulse width modulated optical output signal. A signal representing a digital 0 received at input 12 is converted to an optical pulse having a duration equal to the difference between time A and time B, while a digital 1 is represented by an optical pulse having a shorter time period equal to the duration of the difference between time D and time C. The durations of the respective lengths of the optical pulses may be determined as a matter of design choice by selecting the appropriate RC time constants for the RC networks connected to Schmitt Triggers 26 and 32. For data transmission rates of 100 KBaud and below, the simple RC networks shown in FIG. 1 are satisfactory. However, for higher transmission rates, it may be desirable to provide more sophisticated timing circuitry such as a crystal controlled clock-based pulse generator which gives precise pulse widths and concomitant small jitter, in order to produce optical signals having reliable pulse widths.

According to another embodiment of the invention, it is advantageous to "overdrive" the LED 48. More specifically, an LED's ability to handle large power surges over short time periods is limited by the power dissipating abilities of the conducting wires and the small interconnecting wire connecting the diode to its substrate. All of these components are typically housed in a plastic module. Also, the temperature of the surrounding elements must be considered. If enough current flows for a period of time to raise the temperature sufficiently to melt one of these wires or the semiconductor material, the LED bums out. However, an LED can easily withstand s currents for long period of time or large currents for short period of time. It is advantageous to select the pulse widths from the pulse width modulating circuit in order to keep the duty factor, i.e., the percentage of time the LED remain on, low so that more energy can be delivered to the LED in a short time to increase its light output This maximizes the amount of light output obtainable from the LED which results in longer data transmission ranges and a lower absolute power requirement by the data transmission circuit Therefore, an electrical current can be applied to the light emitting diode that is greater than maximum steady-state electrical current rating for the light emitting diode.

For example, a typical LED, visible or infrared, has a 40 mA maximum rating and a maximum power dissipation of 80 mW. The typical forward voltage drop is 1.7 volts. For purposes of illustration, it will be presumed that the long delay pulse is 5 microseconds and the short delay pulse is 1 microsecond. It will also be assumed that the data transmission rate is 100 KBaud or 10 microseconds per bit. It will be appreciated that the worst case scenario for power consumption with this invention is an adjacent "1" and "0" in the data stream, and this will also be assumed for purposes of the present example.

With these parameters in mind, it is seen that the duty factor equals 6 microseconds/20 micro seconds, or 30%. Therefore, the LED current during this period could be as high as 40 mA/0.3, or 130 mA.

Similarly, at a data speed of 20 KBaud, i.e., 50 microseconds per bit, the duty factor would be equal to 6 microseconds/100 microseconds or 6%. In this situation, the LED could be driven at currents as high 40 mA/0.06, or 660 milliamps.

Referring now to FIG. 4, there is shown a schematic diagram for a receiver circuit 400 according to an embodiment of the invention. The operation of the receiving circuit 400 will also be described with respect to the timing signals shown in FIG. 5. Receiver 400 detects incoming optical pulses on photo diode 404. When a light pulse is received by photo diode 404, increased current from the supply voltage 402 flows through resistor 406 generating a voltage which is passed through capacitor 408 to the inverting input of op-amp 418. The inverting input to op-amp 418 is normally biased to a voltage level determined by resistors 410 and 414, while its noninverting input is biased to a voltage level determined by resistors 412 and 416. Resistors 412 and 416 provide a reference voltage level as a percentage of the supply voltage. The input bias voltages chosen for op-amp 418 will be a matter of design choice depending on the parameters selected in the design of the transmitter and receiver circuits. However, the reference level is typically higher than the signal bias level to keep the circuit off when no signal is present.

In any event, when a light pulse is received on photo diode 404, the inverting input to op-amp 418 transitions high for a time period equivalent to the length of the optical pulse received. The input to the noninverting input of op-amp 418 is shown in signal 61 in FIG. 5. In this case, at time period A, it is seen that the photo diode 404 receives a long duration pulse from the transmitter circuit. For the duration of the pulse, the output from op-amp 418, shown by signal 62, transitions low. The low transition on output signal 62 is then passed to Schmitt triggers 426 and 428. The low going pulse on signal 62 is inverted by Schmitt trigger 428 and immediately passed to the Data input and Reset input of Flip Flop 430. However, the input to Schmitt trigger 426 is initially held high by capacitor 424. As the capacitor 424 charges through resistor 422, the voltage at the input of Schmitt trigger 426 begins to decay as shown in signal 63. After a certain time delay determined by the RC time constant of capacitor 424 and resistor 422, the output of Schmitt trigger 426 goes high and is passed to the clock input of Flip Flop 430 as shown in signal 64. When the clock input signal 64 transitions high, the Q-not output of Flip Flop 430 also transitions high as shown in signal 67. This signal turns on transistor 442 which generates signal 67 as the light output into the receiving circuit 400 either directly or through a fiber optic link. Flip Flop 430 is reset on receipt of the next incoming optical pulse. The timing of the reset of Flip Flop is determined by the RC time constant of the RC network consisting of capacitor 432 and resistor 434 which must be about half of the long duration pulse width. The input signal to the reset input of Flip Flop 430 occurs on every received pulse and is shown by signal 66 in FIG. 5.

The operation of the receiver circuit 400 when the incoming optical pulse is a short duration pulse, indicating a digital 1, is similar to that described above. However, the clock signal 64 does not contain a pulse for short data pulses. Thus, logic level "0" stays in the Flip Flop 430. More specifically, it is seen that as the input to Schmitt trigger 426 decays at time C, shown by signal 63, the short pulse is not long enough to charge up to the Schmitt trigger threshold voltage and therefore does not cause a transition at the output of Schmitt trigger 426. The signal 66 at the Reset input of Flip-Flop 430 resets the Flip-Flop 430 on every pulse. However, while the long pulse at time A on signal 65 is long enough to get clocked in by clock signal 64 which sets the Flip-Flop 430, the short pulse at C on signal 63 never causes a transistion on signal 64, leaving the Flip-Flop 430 reset. It will be noted that this particular embodiment introduces a 2–3 microsecond jitter, which is acceptable on a 10 microsecond, or longer, pulse for serial data. However, for data rates over 100 KBaud the design would be modified to reduce the jitter time for accurate operation. Also, it will be understood that the Flip-Flop 430 in this embodiment has a clock input that is positive-going, edge-triggered. Returning to the example described above, it is seen that the Q-not output from Flip-Flop 430 drives transistor 442 through resistor 440 and produces square wave pulses across resistor 436 and the output into the resistor 444. This signal is, of course, a recreation of the original RS-232 or unipolar signal, depending on the power supply selection use.

In a further embodiment of the invention, the receiving circuit 400 is provided with an option switch 438 which allows the receiving circuit to operate in either bi-polar or uni-polar mode. The switch 438 may be configured in software to allow the circuit to be operated from a laptop computer serial port. With respect to an embodiment to the invention adapted to the RS-232 interface, controlling signals DTR and DTE through software allows the circuit to be completely shut off with zero current drain, further decreasing its power consumption. This embodiment will be described in greater detail with respect to FIGS. 2 and 3.

FIG. 2 is a schematic diagram of a power supply for a uni-polar output. In this case, the RTS signal is applied to Zener diode 200 and the DTR signal is applied to Zener diode 202. Both signals are separated from ground through capacitor 204. In this embodiment, the option switch 438 would be set to connect resistor 436 to ground. For uni-polar output, the circuit-on condition would require the DTR and RTS signals to both be on, or positive voltage while the circuit-off condition requires DTR and RTS to both be off, or negative voltage.

FIG. 3 shows the embodiment of the power supply for bi-polar output. In this case, the RTS signal would be connected as the positive supply voltage rail through Zener diode 300. The negative supply voltage rail would be provided by DTR signal through Zener diode 302. Storage capacitors 304 and 306 would be connected as shown. Option switch 438 and receiver circuit 400 would be connected as shown to join resistor 436 to the negative power supply rail. In this case, a circuit-on condition would require DTR to be off, or negative voltage, and RTS to be on, or positive. A circuit-off condition would require DTR to be on or positive, while RTS was off, or negative.

Although the invention has been described with respect to certain preferred embodiments, it will be understood by those with skill in the art that these embodiments are provided for purposes of illustration only and are not intended to be limiting of the invention.

What is claimed is:

1. A circuit for receiving optical pulses containing pulse width modulated digital information, the circuit comprising:

a device for generating electronic pulses responsive to the digital information, the width of the electronic pulses being responsive to the width of the received optical pulses and having either a first width or a second width which is responsive to a first logic level in digital information and a second logic level in the digital information, respectively;

a Schmitt trigger which compares the electronic pulses to a reference voltage that is a percentage of the power supply voltage and passes the electronic pulses to a first inverter and a second inverter;

wherein the first inverter inverts and passes the electronic pulses to a Data input of a Flip-Flop circuit and to an RC network that controls the reset of the Flip-Flop circuit, and the second inverter inverts and passes the electronic pulses to the Clock input of the Flip-Flop circuit after a time delay determined by an RC network coupled to an input to the second inverter, the time delay being such that pulses having a first width cause a first logic level to be clocked into the Flip-Flop and pulses having a second width cause a second logic level to be reset into the Flip-Flop.

2. A circuit as in claim 1 wherein the device for generating electronic pulses comprises a photo-diode.

3. A circuit as in claim 1 further comprising an option switch that allows the Flip-Flop circuit to generate either a uni-polar or a bi-polar output.

4. A circuit as in claim 9 wherein the option switch is implemented in software.

5. A system for optically transmitting digital information comprising:

an optical transmitter having an input for electronically receiving digital information, a pulse width modulation cit that modulates the digital information into electronic pulses having either a first width or a second width depending on the logic level of the digital information, and a device for generating optical pulses responsive to the electronic pulses, the width of the optical pulses being proportional to the widths of the electronic pulses;

a receiver that receives optical pulses generated by the optical transmitter, the receiver including a device for generating received electronic pulses responsive to the digital information, the width of the received electronic pulses being responsive to the width of the received optical pulses and having either a first width or a second width which is responsive to a first logic level in digital information and a second logic level in the digital information, respectively;

a Schmitt trigger which compares the received electronic pulses to a reference voltage that is a percentage of the power supply voltage and passes the electronic pulses to a first inverter and a second inverter;

wherein the first inverter inverts and passes the electronic pulses to a Data input of a Flip-Flop circuit and to an RC network that controls the reset of the Flip-Flop circuit, and the second inverter inverts and passes the received electronic pulses to the Clock input of the Flip-Flop circuit after a time delay determined by an RC network coupled to an input to the second inverter, tie time delay being such that pulses having a first width cause a firt logic level to be clocked into the Flip-Flop and pulses having a second width cause a second logic level to be clocked into the Flip-Flop.

6. A circuit as in claim 5 further comprising an option switch that allows the Flip-Flop circuit to generate either a uni-polar or a bi-polar output.

7. A circuit for receiving optical pulses containing pulse width modulated digital information, the circuit comprising:

a device for generating electronic pulses responsive to the digital information, the width of the electronic pulses being responsive to the width of the received optical pulses and having either a first width or a second width which is responsive to a first logic level in digital information and a second logic level in the digital information, respectively;

an operational amplifier which compares the electronic pulses to a reference voltage that is a percentage of the power supply voltage and passes the electronic pulses to a first inverter and a second inverter wherein the first inverter inverts and passes the electronic pulses to a Data input of a Flip-Flop circuit and to an RC network that controls the reset of the Flip-Flop circuit, and the second inverter inverts and passes the received electronic pulses to the Clock input of the Flip-Flop circuit after a time delay determined by an RC network coupled to an input to the second inverter, the time delay being such that pulses having a first width cause a firt logic level to be clocked into the Flip-Flop and pulses having a second width cause a second logic level to be reset into the Flip-Flop.

8. A circuit as in claim 7 wherein the operational amplifier comprises an inverter.

9. A circuit as in claim 7 further comprising an option switch that allows the Flip-Flop circuit to generate either a uni-polar or a bi-polar output.

\* \* \* \* \*

UNITED STATES PATENT AND TRADEMARK OFFICE
CERTIFICATE OF CORRECTION

PATENT NO. : 6,590,687 B1
DATED : July 8, 2003
INVENTOR(S) : Olsen

It is certified that error appears in the above-identified patent and that said Letters Patent is hereby corrected as shown below:

Column 1,
Line 51, before "computer equipment attains", please delete "modem" and insert therefor: -- modern --.

Column 2,
Line 34, before "as will" and following "RS-232", please insert: -- , --.

Column 4,
Line 32, please delete "I's" and insert therefor: -- 1's --.

Column 5,
Line 23, please delete "bums" and insert therefor: -- burns --.
Line 24, before "currents" and following "withstand", please delete "s" and insert therefor: -- small --.
Line 28, please delete "remain" and insert therefor: -- remains --.
Line 30, before "This" and following "output", please insert: -- . --.
Line 33, before "Therefore" and following "circuit", please insert: -- . --.

Column 8,
Line 5, please delete "cit" and insert therefor: -- circuit --.
Line 32, please delete "tie" and insert therefor: -- the --.

Signed and Sealed this

Twenty-eighth Day of October, 2003

JAMES E. ROGAN
*Director of the United States Patent and Trademark Office*